United States Patent [19]

Miyatake et al.

[11] Patent Number: 5,303,053
[45] Date of Patent: Apr. 12, 1994

[54] CHARGE COUPLED DEVICE FOR OVERCOMING AN OUTPUT VOLTAGE DIFFERENCE BETWEEN DIFFERENT SHIFT REGISTERS

[75] Inventors: Shigehiro Miyatake, Osaka; Kenji Takada, Itami, both of Japan

[73] Assignee: Minolta Camera Kabushiki Kaisha, Osaka, Japan

[21] Appl. No.: 899,437

[22] Filed: Jun. 16, 1992

[30] Foreign Application Priority Data

Jun. 17, 1991 [JP] Japan .................................. 3-173023

[51] Int. Cl.⁵ .......................... H04N 3/14; H04N 5/335
[52] U.S. Cl. .................................. 348/312; 257/241; 348/313
[58] Field of Search .................. 358/213.29, 213.23, 358/213.31, 213.15; 257/246, 248, 250, 241; H04N 5/335

[56] References Cited

U.S. PATENT DOCUMENTS

| 4,281,254 | 7/1981 | Seachman | 358/213.23 |
| 4,443,774 | 4/1984 | Luder et al. | 257/241 |
| 4,628,347 | 12/1986 | Sato et al. | 257/241 |

FOREIGN PATENT DOCUMENTS 291954  9/1988  Japan .

Primary Examiner—Joseph Mancuso
Assistant Examiner—Wendy R. Greening
Attorney, Agent, or Firm—Price, Gess & Ubell

[57] ABSTRACT

A charge coupled device includes shift registers, a common transfer electrode, and a floating and diffusion layer. Clock pulses are applied to the common transfer electrode. In response to the clock pulses, the common transfer electrode outputs signal charges to the floating and diffusion layer at a time when the shift registers are not being driven. Therefore, there is no output voltage level difference between the different shift registers.

18 Claims, 8 Drawing Sheets

CHARGE COUPLED DEVICE FOR OVERCOMING AN OUTPUT VOLTAGE DIFFERENCE BETWEEN DIFFERENT SHIFT REGISTERS

BACKGROUND OF THE INVENTION

1. Field of the Invention

The present invention relates to a charge coupled device (hereinafter referred to as CCD), and more particularly, to the construction of a charge-voltage converting portion thereof.

2. Description of the Prior Art

Recently, CCD shift registers are widely used for solidstate image sensing devices and analog delay devices. For these devices, a method is frequently used where a serial of information is transferred after alternately allotted and inputted into two CCD analog shift registers for the purpose of reducing a picture element pitch and a driving frequency.

Generally, an output portion of the CCD is provided with a charge-voltage converting portion, where a signal charge transferred in the CCD is converted into a voltage which is in proportion to a charge quantity thereof and is taken out as an output signal after passing through an output amplifier.

In a case where the signal charge is inputted into two CCD shift registers and transferred, it is necessary to compose these two signals thereafter. It is desirable to compose the two signals before the signal charge is transferred to the charge-voltage converting portion. If the charge-voltage converting portion and an output amplifier were provided to an output portion of each shift register, since each charge-voltage converting portion and each output amplifier sometimes have different characteristics due to the difference in manufacturing dimension, the outputs of the two CCD shift registers might be different from each other.

FIGS. 1 and 2 show the arrangement of a conventional CCD where two CCD shift registers have a common charge-voltage converting portion. FIG. 1 shows a plane configuration thereof. FIG. 2 shows timing of clock pulses and an output signal.

As shown in FIG. 1, two CCD shift registers which are an A channel and a B channel are provided in this prior art. To form these CCD shift registers, for example, n-type semiconductor areas 1 and 2 are formed on a P-type silicon substrate. On upper portions of the semiconductor areas 1 and 2, a plurality of transfer electrodes 3, 4, 5 and 6 are provided through a gate insulating film such as an SiO2 film.

In the CCD shift registers, which employ a two-phase drive method, a clock pulse $\phi 1$ is applied to the transfer electrodes 3 and 6, and a clock pulse $\phi 2$ having a phase different from that of the clock pulse $\phi 1$ by 180° is applied to the transfer electrodes 4 and 5. A barrier for deciding a transfer direction is formed at a lower portion of each transfer electrode by ion implantation of P-type impurity. The signal charge is transferred only from the right to the left through the lower portion of the transfer electrode and is not transferred from the left to the right therethrough.

The A channel and the B channel are coupled at an output electrode 7, and connected to a floating and diffusion layer 8. The floating and diffusion layer is connected to a reset drain 10 through a reset gate electrode 9. The floating and diffusion layer 8 and the reset gate electrode 9 are formed by diffusing n-type impurity into the P-type silicon substrate at a high density. The floating and diffusion layer 8, the reset gate electrode 9 and the reset drain 10 constitute a MOS (metal oxide semiconductor) transistor. That is, the reset drain 10, the floating and diffusion layer 8 and the reset gate electrode 9 function as a drain, a source and a gate of the MOS transistor, respectively.

The potential of the floating and diffusion layer 8 is directed out to an output terminal 22 through a conductive line 11 and a MOS transistor 12. For this reason, the conductive line 11 is connected to the gate of the MOS transistor 12. The source of the MOS transistor 12 is connected to an earth terminal 23 through a resistor 13 and to the output terminal 22. In this case, the MOS transistor 12 operates as a source follower amplifier.

A DC (direct current) voltage OG is applied to the output electrode 7, while a DC voltage RD is applied to the reset drain 10. Moreover, a DC voltage OD is applied to the drain of the MOS transistor 12 through a terminal 21. Further, a clock pulse $\phi R$ is applied to the reset gate electrode 9.

Subsequently, the operation of the above prior art will be described with reference to FIG. 2. When the level of the clock pulse $\phi R$ is high at t=t1, the potential of the floating and diffusion layer 8 is RD. When the level of the clock pulse $\phi R$ is low at t=t2, the floating and diffusion layer 8 is under a floating condition with respect to its potential. Then, the level of the clock pulse $\phi 1$ is low at t=t3, the signal charge of the A channel reaches the floating and diffusion layer 8 by way of a lower portion of the output electrode 7, and reduces the potential of the floating and diffusion layer 8 by discharging the junction capacitor of the floating and diffusion layer 8. Since the quantity of the potential reduction is in proportion to the signal charge quantity, the signal charge quantity is converted into a voltage.

Then, when the level of the clock pulse $\phi R$ is high again at t=t4, the potential of the floating and diffusion layer 8 is RD. When the level of the clock pulse $\phi R$ is low at t=t5, the floating and diffusion layer 8 is under the floating condition with respect to its potential. Then, when the level of the clock pulse $\phi 2$ is low at t=t6, the signal charge of the B channel reaches the floating and diffusion layer 8 by way of the lower portion of the output electrode 7, and reduces the potential of the floating and diffusion layer 8 by discharging the junction capacitor of the floating and diffusion layer 8.

By repeating the above-described operation, the signal charges of the A and B channels alternately reach the floating diffusion layer 8 and are converted into voltages. The potential of the floating and diffusion layer 8 is taken out as an output signal OS from the output terminal 22 by way of the source follower amplifier consisting of the MOS transistor 12.

Japanese laid-open Patent Application H2-91954 discloses a CCD where a plurality of transfer electrodes are further provided between the end terminal and the output terminal of each channel, and clock pulses $\phi 3$ and $\phi 4$ having frequencies higher than those of the clock pulses $\phi 1$ and $\phi 2$ are applied to the transfer electrodes and thereby the signal charge is transferred to the output terminal side.

As described above, signals of the two CCD shift registers can be composed before the signal charge is transferred to the charge-voltage converting portion. Thereby, it is enabled to obtain output signals produced by the same charge-voltage converting portion and by the same output amplifier.

Even with the arrangement of FIGS. 1 and 2, however, the signal of the A channel and that of the B channel are sometimes different, particularly, in the DC level. The cause thereof is considered as follows: after the floating and diffusion layer 8 is brought into the floating condition with respect to its potential, the signal charge of the A channel reaches the floating and diffusion layer 8 by the level down of the clock pulse $\phi 1$, while the signal charge of the B channel reaches the floating and diffusion layer 8 by the level down of the clock pulse $\phi 2$.

The floating and diffusion layer 8 is capacitance-coupled with the electrodes and conductive lines to which the clock pulse $\phi 1$ is applied and with the electrodes and conductive lines to which the clock pulse $\phi 2$ is applied through an aluminum shade or a silicon substrate provided on an upper portion of the CCD through an insulating layer. Because of this arrangement, the floating and diffusion layer 8 is induced by the clock pulses $\phi 1$ and $\phi 2$. Due to the limitation in pattern layout, it is difficult to make the two capacitance couplings completely identical. Moreover, concerning the clock pulses $\phi 1$ and $\phi 2$, it is also difficult to generate them by use of clock drivers having the same characteristics. For this reason, the induction received by the floating and diffusion layer 8 is different between at $t=t2$ and at $t=5$, so that a difference is caused in the DC level.

Moreover, the above-mentioned Japanese laid-open Patent Application H2-91954 also teaches that signal charges of two channels are composed and transferred by use of a common transfer electrode. However, when the clock pulse $\phi 4$ of the transfer electrode is activated, since the clock pulses $\phi 1$ and $\phi 2$ of each channel are also activated, the capacitance coupling of each channel is different from each other. Thereby, the output of the signal charge of each channel is different from each other in the DC level.

SUMMARY OF THE INVENTION

An object of the present invention is to provide a characteristic that there is no level difference among the signals of a plurality of channels to a charge coupled device where a plurality of signals are composed before the signal charge is transferred to the charge-voltage converting portion.

To achieve the above-mentioned object, a charge coupled device according to the present invention is provided with: a plurality of shift registers; a common output portion for receiving a signal charge from said plurality of shift registers; and means for causing signal charge transfer to said output portion to be carried out when a drive pulse of said shift registers is halted.

BRIEF DESCRIPTION OF THE DRAWINGS

This and other objects and features of this invention will become clear from the following description taken in conjunction with the preferred embodiments with reference to the accompanied drawings in which.

DESCRIPTION OF THE PREFERRED EMBODIMENTS

Embodiments of the present invention will hereinafter be described with reference to the drawings.

Figure 3:
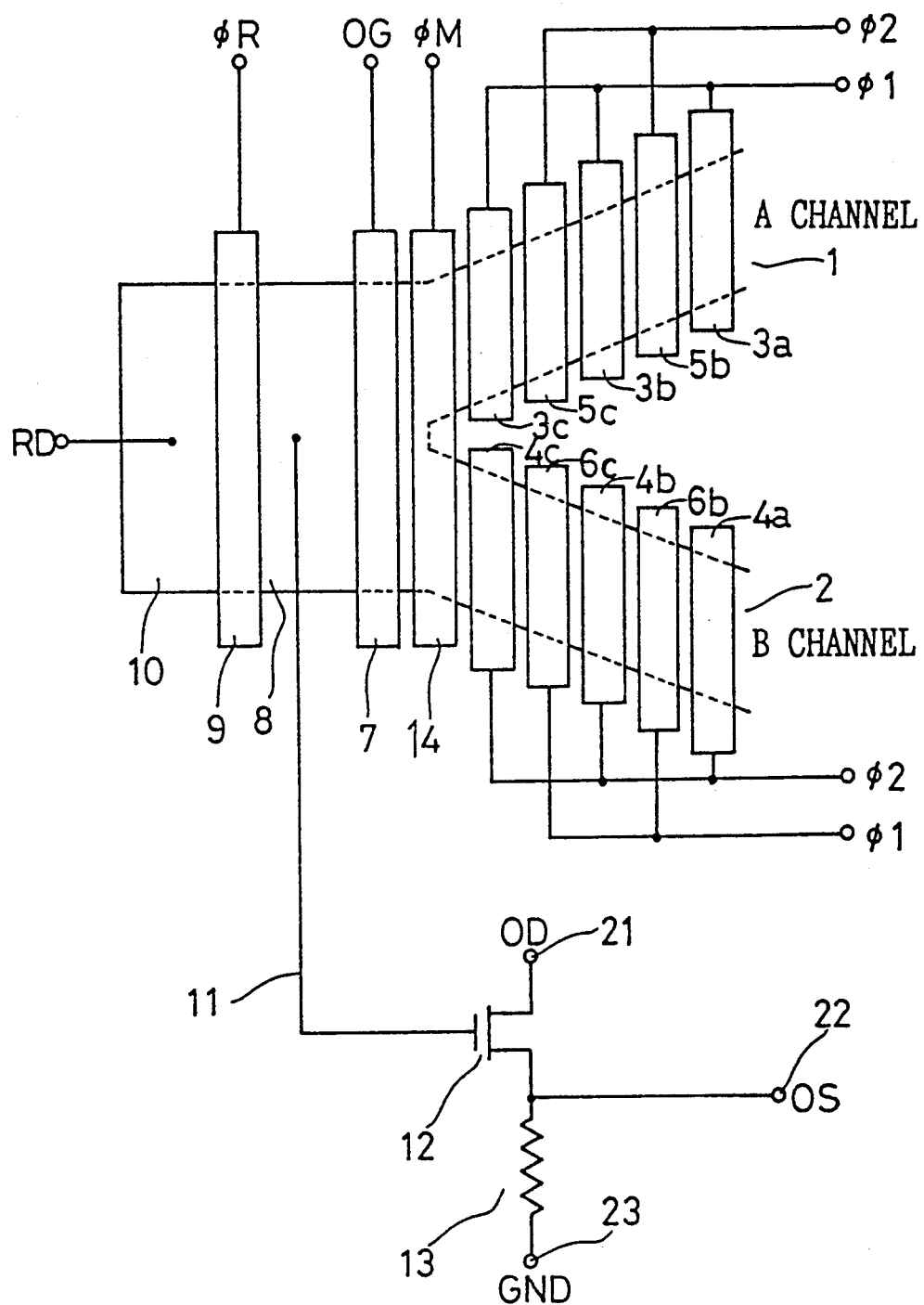
FIG. 3 shows a plane configuration of a first embodiment of the present invention.
Figure 4:
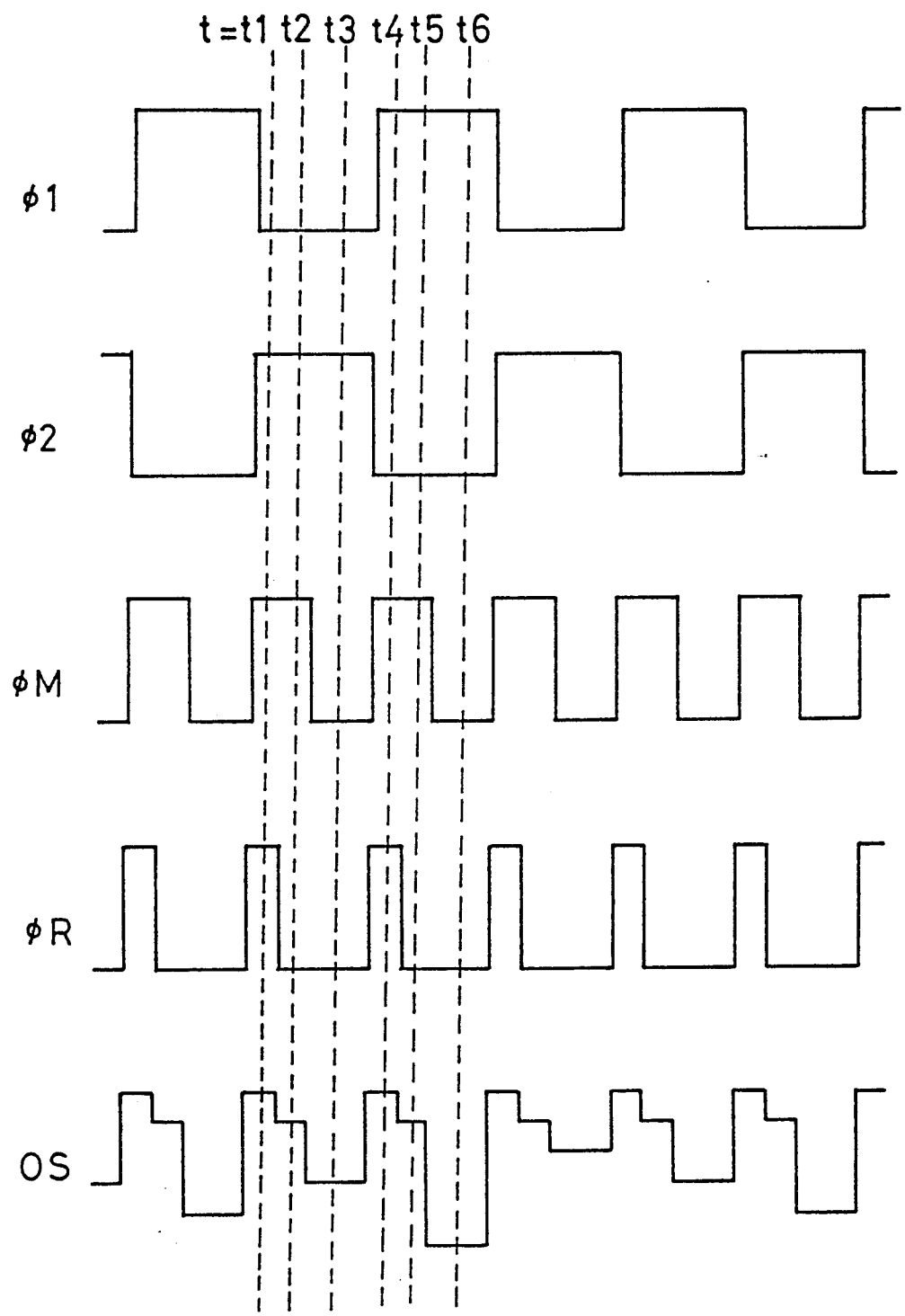
FIG. 4 is a wave form chart showing timing of clock pulses and an output signal thereof.

FIGS. 3 and 4 show a CCD which is a first embodiment of the present invention. FIG. 3 shows a plane configuration thereof. FIG. 4 shows timing of clock pulses and an output signal.

As shown in FIG. 3, two CCD shift registers which are an A channel and a B channel are provided in this embodiment. To form these CCD shift registers, similarly to the previously-described prior art, for example, N-type semiconductor areas 1 and 2 are provided on a P-type silicon substrate, and a plurality of transfer electrodes 3a to 3c, 4a to 4c, 5b, 5c, 6b and 6c are provided on an upper portion of the semiconductor areas 1 and 2 through a gate insulating film such as an SiO2 film.

In this embodiment, which employs a two-phase drive method. A clock pulse $\phi 1$ is applied to the transfer electrodes 3a, 3b, 3c, 6b and 6c. Moreover, a clock pulse $\phi 2$ having a phase different from that of the clock pulse $\phi 1$ by 180° is applied to the transfer electrodes 4a, 4b, 4c, 5b and 5c. A barrier for deciding a transfer direction is formed at a lower portion of each transfer electrode by ion implantation of P-type impurity. The signal charge is transferred only from the right to the left through the lower portion of the transfer electrode and is not transferred from the left to the right therethrough.

The A channel and the B channel are coupled at a common transfer electrode 14, and connected to an output electrode 7. The common transfer electrode 14, which is newly added according to the present invention, performs an important function conjointly with a subsequently-described clock pulse $\phi M$. The common transfer electrode 14 is an electrode of a common shift register formed thereunder.

At a lower portion of the common transfer electrode 14, a barrier for deciding a transfer direction is also formed by ion implantation of P-type impurity. The signal charge is transferred only from the right to the left through the lower portion of the common transfer electrode 14.

Figure 1:
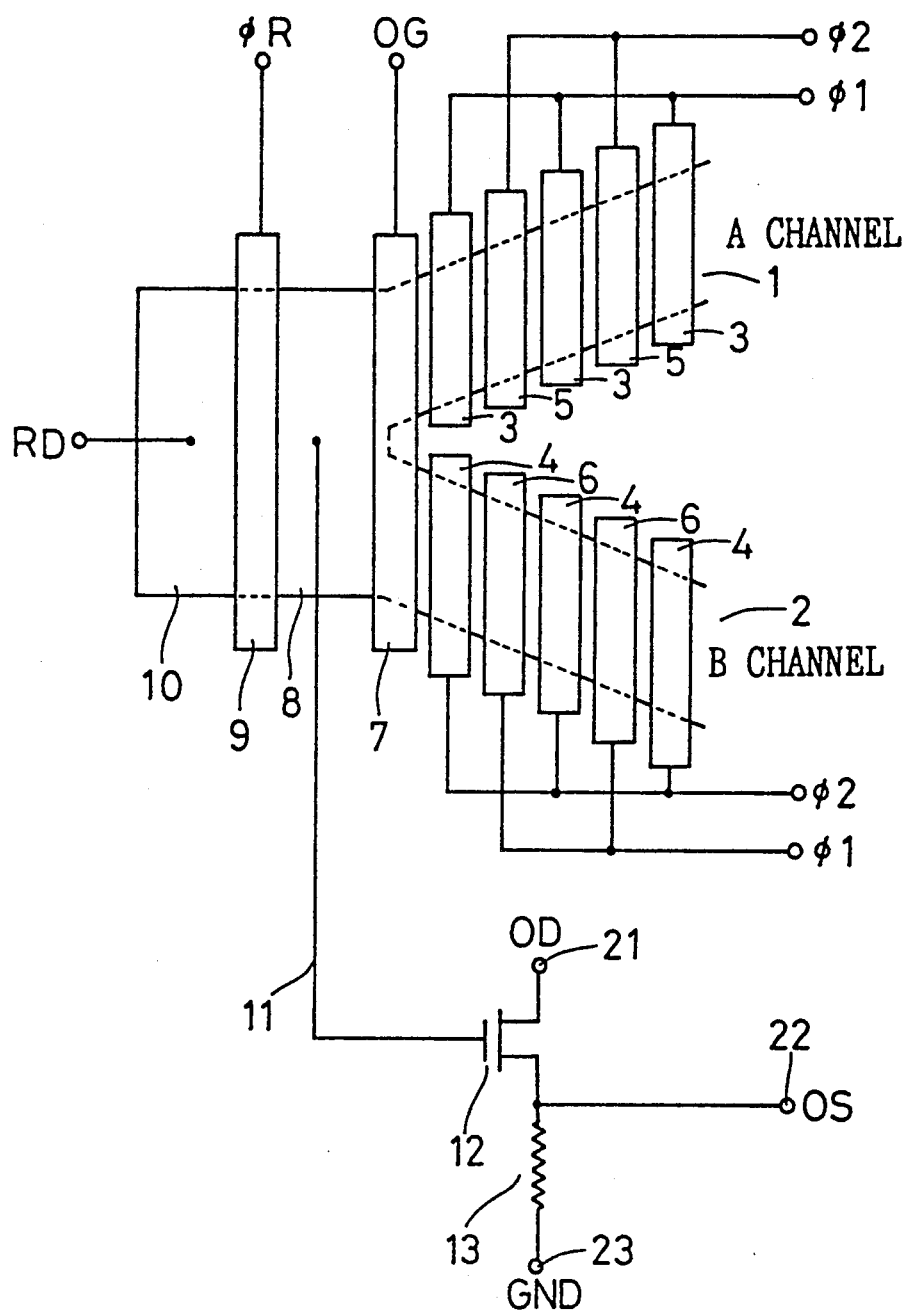
FIG. 1 shows a plane configuration of a conventional CCD.
Figure 2:
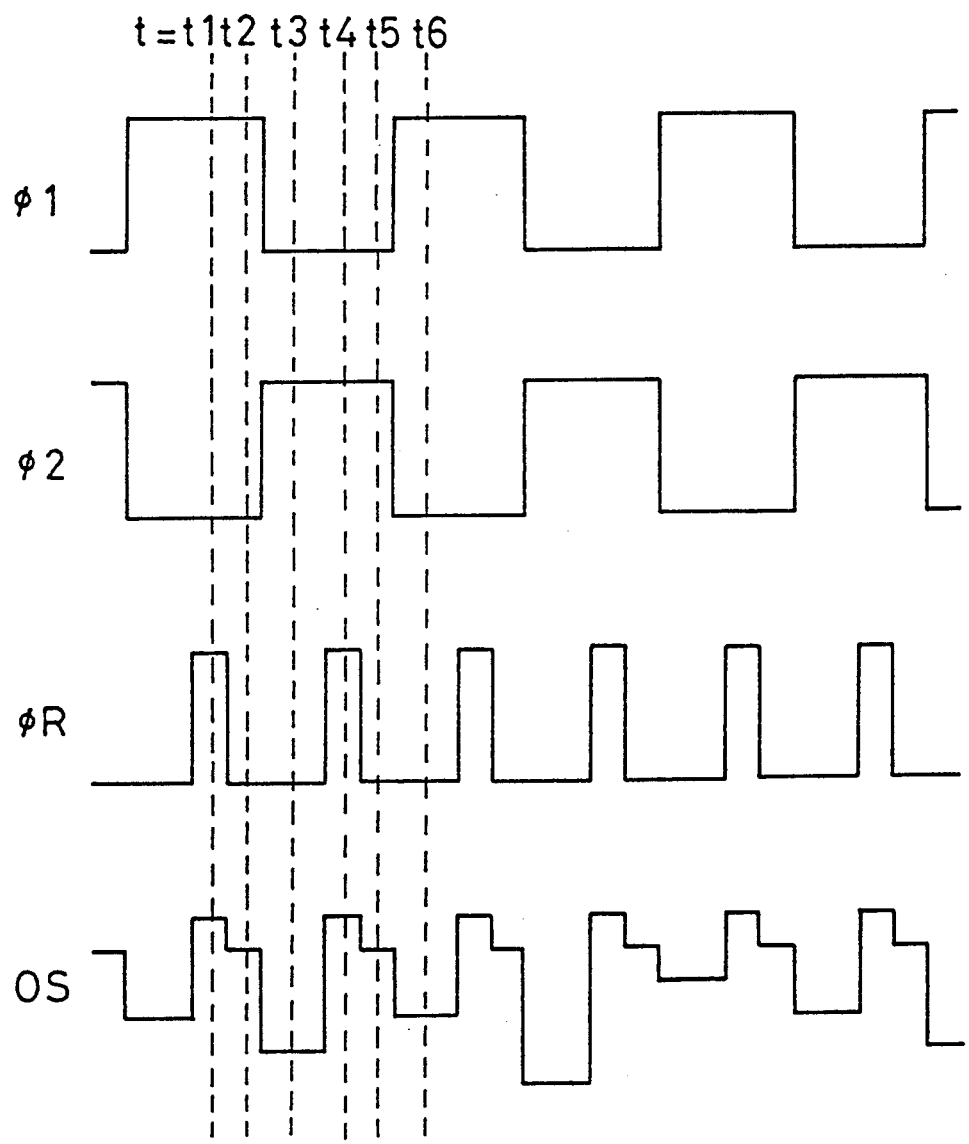
FIG. 2 is a wave form chart showing timing of clock pulses and an output signal thereof.

A detailed description of the output electrode 7, a floating and diffusion layer 8, a reset gate electrode 9 and a reset drain 10 will be omitted, since they are the same as those of the prior art of FIG. 1.

Moreover, a conductive line 11, a MOS transistor 12, a resistor 13 and an output terminal 22 are the same as those of FIG. 1.

A DC voltage OG, a DC voltage RD and a DC voltage OD are applied to the output terminal 7, the reset drain 10 and the MOS transistor 12, respectively. Moreover, a clock pulse $\phi R$ is applied to the reset gate electrode 9.

Subsequently, the operation of the first embodiment will be described with reference to FIG. 4.

The level down (that is, a level change from high to low) of the clock pulse $\phi M$ applied to the common transfer electrode 14 functions to transmit the signal charge stored in the lower portion of the common transfer electrode 14 out to the floating and diffusion layer 8. The level down is made when the levels of the clock pulses $\phi 1$ and $\phi 2$ do not change, that is, in the figure, when the clock pulse $\phi 1$ is of low level or of high level while the clock pulse $\phi 2$ is of high level or of low level (this condition is equivalent to that the charge transfer functions of the clock pulses $\phi 1$ and $\phi 2$ are deactivated).

When the level of the clock pulse $\phi R$ is high at t=t1, the potential of the floating and diffusion layer 8 is RD. When the level of the clock pulse $\phi R$ is low at t=t2, the floating and diffusion layer 8 is under a floating condition with respect to its potential. On the other hand, the signal charge of a lower portion of the transfer electrode 3c (the clock pulse $\phi 1$ is applied to the electrode 3c) arranged at the left end of the A channel is transferred to the lower portion of the common transfer electrode 14 by a level down of the clock pulse $\phi 1$ and a level up (that is, a level change from low to high) of the clock pulse $\phi M$ at t=t1. When this happens, in the B channel, the signal charge is stored in a lower portion of the transfer electrode 4c by the level up of the clock pulse $\phi 2$.

Then, when the level of the clock pulse $\phi M$ is low at t=t3, the signal charge (that is, the signal charge transferred through the A channel) stored in the lower portion of the common transfer electrode 14 reaches the floating and diffusion layer 8 by way of a lower portion of the output electrode 7, and reduces the potential of the floating and diffusion layer 8 by discharging the junction capacitor of the floating and diffusion layer 8. Since the quantity of the potential reduction is in proportion to the signal charge quantity, the signal charge quantity is converted into a voltage.

When the level of the clock pulse $\phi R$ is high again at t=t4, the potential of the floating and diffusion layer 8 is RD. When the level of the clock pulse $\phi R$ is low at t=t5, the floating and diffusion layer 8 is under the floating condition with respect to its potential. On the other hand, the signal charge of the lower portion of the transfer electrode 4c (the clock pulse $\phi 2$ is applied to the electrode 4c) arranged at the left end of the B channel is transferred to the lower portion of the common transfer electrode 14 by a level down of the clock pulse $\phi 2$ and a level up of the clock pulse $\phi M$ at t=t4. When this happens, in the A channel, the signal charge is stored in the lower portion of the electrode 3c by the level up of the clock pulse $\phi 1$.

Then, when the level of the clock pulse $\phi M$ is low at t=t6, the signal charge (that is, the signal charge transferred through the B channel) stored in the lower portion of the common transfer electrode 14 reaches the floating and diffusion layer 8 by way of the lower portion of the output electrode 7, and reduces the potential of the floating and diffusion layer 8 by discharging the junction capacitor of the floating and diffusion layer 8.

By repeating the above-describe operation, the signal charges of the A and B channels alternately reach the floating and diffusion layer 8 by way of the common transfer electrode 14 and the output electrode 7, whereby a voltage change in proportion to the signal charge quantity is caused in the floating and diffusion layer 8. The potential of the floating and diffusion layer 8 is taken out as an output signal OS from the output terminal 22 by way of a source follower amplifier consisting of the MOS transistor 12.

As described above, in the CCD of this embodiment, the signal charge reaches the floating and diffusion layer 8 when the level of the clock pulse $\phi M$ is changed from high to low. When this happens, the levels of the clock pulses $\phi 1$ and $\phi 2$ do not change from high to low or from low to high. On the other hand, since the level of the clock pulse $\phi R$ is high when the levels of the clock pulses $\phi 1$ and $\phi 2$ change, the potential of the floating and diffusion layer 8 is fixed to RD. For this reason, the potential of the floating and diffusion layer 8 is never changed by the induction by the clock pulses $\phi 1$ and $\phi 2$. The potential of the floating and diffusion layer 8 is induced by the clock pulse $\phi M$. However, since the clock pulse $\phi M$ changes in the same manner both when the signal charge of the A channel reaches the floating and diffusion layer 8 and when the signal charge of the B channel reaches the floating and diffusion layer 8, the potential change of the floating and diffusion layer 8 is the same in both cases. Therefore, no difference is caused between the DC level of the signal of the A channel and that of the signal of the B channel.

Figure 5:
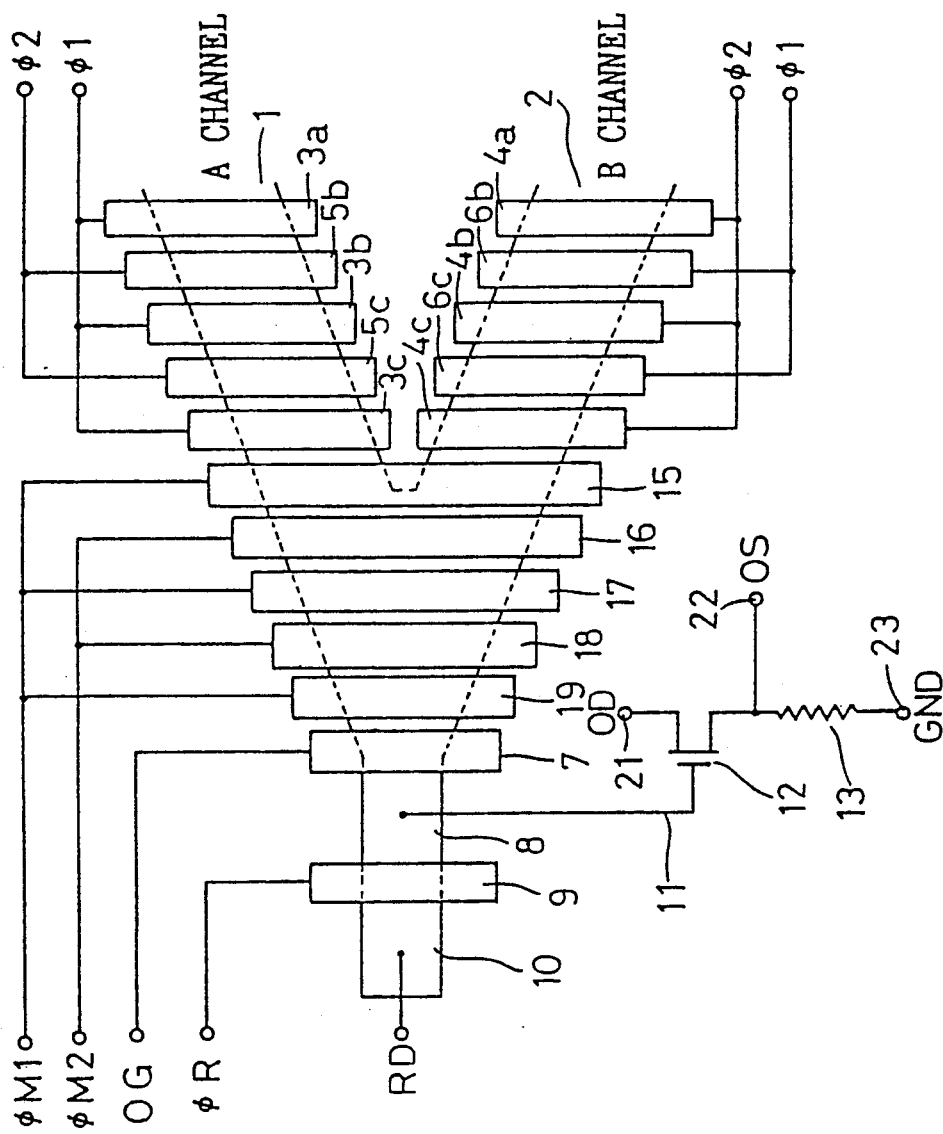
FIG. 5 shows a plane configuration of a second embodiment of the present invention.
Figure 6:
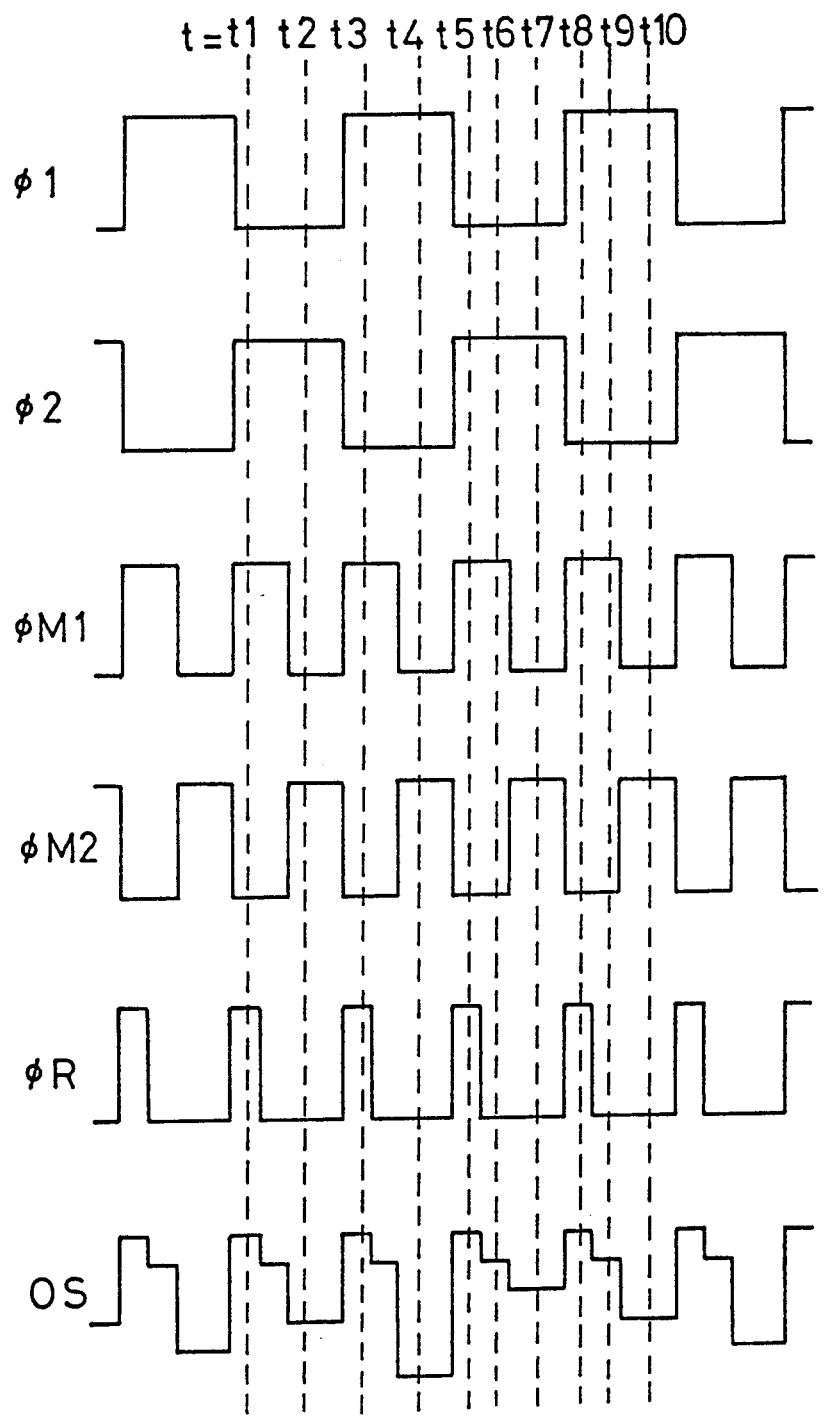
FIG. 6 is a wave form chart showing timing of clock pulses and an output signal thereof.

Subsequently, FIGS. 5 and 6 show a CCD which is a second embodiment of the present invention. FIG. 5 shows a plane configuration thereof. FIG. 6 shows timing of clock pulses and an output signal.

In this embodiment, a plurality of common transfer electrodes 15 to 19 are provided instead of the common transfer electrode 14 of FIG. 3. Moreover, a clock pulse $\phi M1$ is applied to electrodes 15, 17 and 19, while a clock pulse $\phi M2$ is applied to electrodes 16 and 18. Further, a barrier for deciding a transfer direction is formed at lower portions of the common transfer electrodes by ion implantation. The signal charge is transferred only from the right to the left through the lower portions of the common transfer electrodes and is not transferred from the left to the right.

Generally, when a signal charge is generated, it is necessary to reduce a capacitance C in order to obtain a large output voltage V as is understood from the equation Q=CV (where Q is a charge and V is an output voltage). Therefore, by composing signal charges by use of a plurality of common transfer electrodes, the area, that is, the junction capacitor of the floating and diffusion layer 8 can be reduced, whereby a large signal output voltage can be obtained with respect to the same signal charge quantity. The employment of a plurality of the common transfer electrodes enables improvement in charge transfer efficiency by gradually reducing the width of a transfer channel.

Moreover, a noticeable point of this embodiment is that three electrodes are provided to which the clock pulse $\phi M1$ is applied while two electrodes are provided to which the clock pulse $\phi M2$ is applied. That is, the clock pulse $\phi M1$ is applied to both the common transfer electrode 15 which is in contact with the transfer electrode 3c and 4c arranged at the left end of the A and the B channels and the common transfer electrode 19 which is in contact with the output electrode 7.

In other words, the bit number (two electrodes such as electrodes 15 and 16 are counted as one bit) of a shift register constituted by the common transfer electrodes 15 to 19 is n+0.5 (n is an integer). That the bit number is n+0.5 (odd number) means that, in order to prevent the induction of the clock pulses $\phi 1$ and $\phi 2$, it is simply required to cause only the clock pulse $\phi M1$ applied to the last common transfer electrode 19 to activate while the clock pulses $\phi 1$ and $\phi 2$ are being deactivated, and that the clock pulse $\phi M2$ which does not influence the last common transfer electrode 19 may be activated while the clock pulses φ1 and φ2 are being activated. Concerning this point, the previously-mentioned Japanese laid-open Patent Application H2-91954 employs for common transfer electrodes clock pulses φ3 and φ4 similar to the clock pulses φM1 and φM2. However, since the number of the common transfer electrodes are even, the clock pulse φ4 is always activated simultaneously with the clock pulses φ1 and φ2, so that the level of each channel is different from each other when a signal voltage is obtained.

Subsequently, the operation of the second embodiment will be described with reference to FIG. 6.

By the level down of the clock pulse φ1 and the level up of the clock pulse φM1 at t=t1, the signal charge of the lower portion of the transfer electrode 3c (the clock pulse φ1 is applied to the electrode 3c) arranged on the left end of the A channel is transferred to a lower portion of an adjoining common transfer electrode. When this happens, in the B channel, the signal charge is stored in the lower portion of the transfer electrode 4c due to the high level of the clock pulse φ2.

Then, by the level down of the clock pulse φM1 and the level up of the clock pulse φM2 at t=t2, the signal charge of a lower portion of the common transfer electrode 15 moves to a lower portion of the common transfer electrode 16. On the other hand, the signal charges of the A and B channels are not transferred but maintained, since the levels of the clock pulses φ1 and 2 do not change.

Then, at t=t3, since the levels of the clock pulses φ1, φ2, φM1 and φM2 are changed from low to high or from high to low, the signal charges of the A and B channels move toward the left by half a bit, and the signal charge of the lower portion of the common transfer electrode 16 moves to a lower portion of the common transfer electrode 17. Moreover, the signal charge of the lower portion of the signal electrode 4c (the clock pulse φ2 is applied to the electrode 4c) arranged on the left end of the B channel is transferred to the lower portion of the common transfer electrode 15.

Since the level of the clock pulse φM1 is changed from high to low and the level of the clock pulse φM2 is changed from low to high at t=t4, the signal charge of the lower portion of the common transfer electrode 17 is transferred to a lower portion of the common transfer electrode 18, and the signal charge of the lower portion of the common transfer electrode 15 is transferred to the lower portion of the common transfer electrode 16.

When the level of the clock pulse φR is high at t=t5, the potential of the floating and diffusion layer 8 is RD. When the level of the lock pulse φR is low at t=t6, the floating and diffusion layer is under the floating condition with respect to its potential. Concerning the signal charges, since the level of the clock pulse φM1 is changed from low to high and the level of the clock pulse φM2 is changed from high to low at t=t5, the signal charge of the lower portion of the common transfer electrode 18 is transferred to a lower portion of the common transfer electrode 19, and the signal charge of the lower portion of the common transfer electrode 16 is transferred to the lower portion of the common transfer electrode 17. Then, since the clock pulse φM1 is changed from high to low at t=t7, the signal charge (that is, the signal charge transferred through the A channel) of the lower portion of the common transfer electrode 19 reaches the floating and diffusion layer 8 by way of the lower portion of the output electrode 7 to reduce the potential of the floating and diffusion layer 8. Thereby, charge-voltage conversion is performed. Moreover, when this happens, the signal charge of the lower portion of the common transfer electrode 17 is transferred to the lower portion of the common transfer electrode 18.

Then, when the level of the clock pulse φR is high at t=t8, the potential of the floating and diffusion layer 8 is RD. When the level of the clock pulse φR is low at t=t9, the floating and diffusion layer 8 is under the floating condition with respect to its potential. On the other hand, concerning the signal charge, since the level of the clock pulse φM1 is changed from low to high and the level of the clock pulse φM2 is changed from high to low at t=8, the signal charge of the lower portion of the common transfer electrode 18 is transferred to the lower portion of the common transfer electrode 19. Then, since the level of the clock pulse φM1 is changed to low at t=t10, the signal charge (that is, the signal charge transferred through the B channel) of the lower portion of the common transfer electrode 19 reaches the floating and diffusion layer 8 by way of the lower portion of the output electrode 7. Thereby, charge-voltage conversion is made.

By repeating the above-described operation, the signal charges of the A and B channels alternately reach the floating and diffusion layer 8 by way of the common transfer electrodes 15 to 19 and the output electrode 7, whereby charge-voltage conversion is made.

As described above, in the second embodiment, similarly to the first embodiment, the clock pulses φ1 and φ2 are halted when the signal charge reaches the floating and diffusion layer 8, that is, when the charge-voltage conversion is made. For this reason, no difference is caused between the DC level of the signal of the A channel and that of the signal of the B channel.

Figure 7:
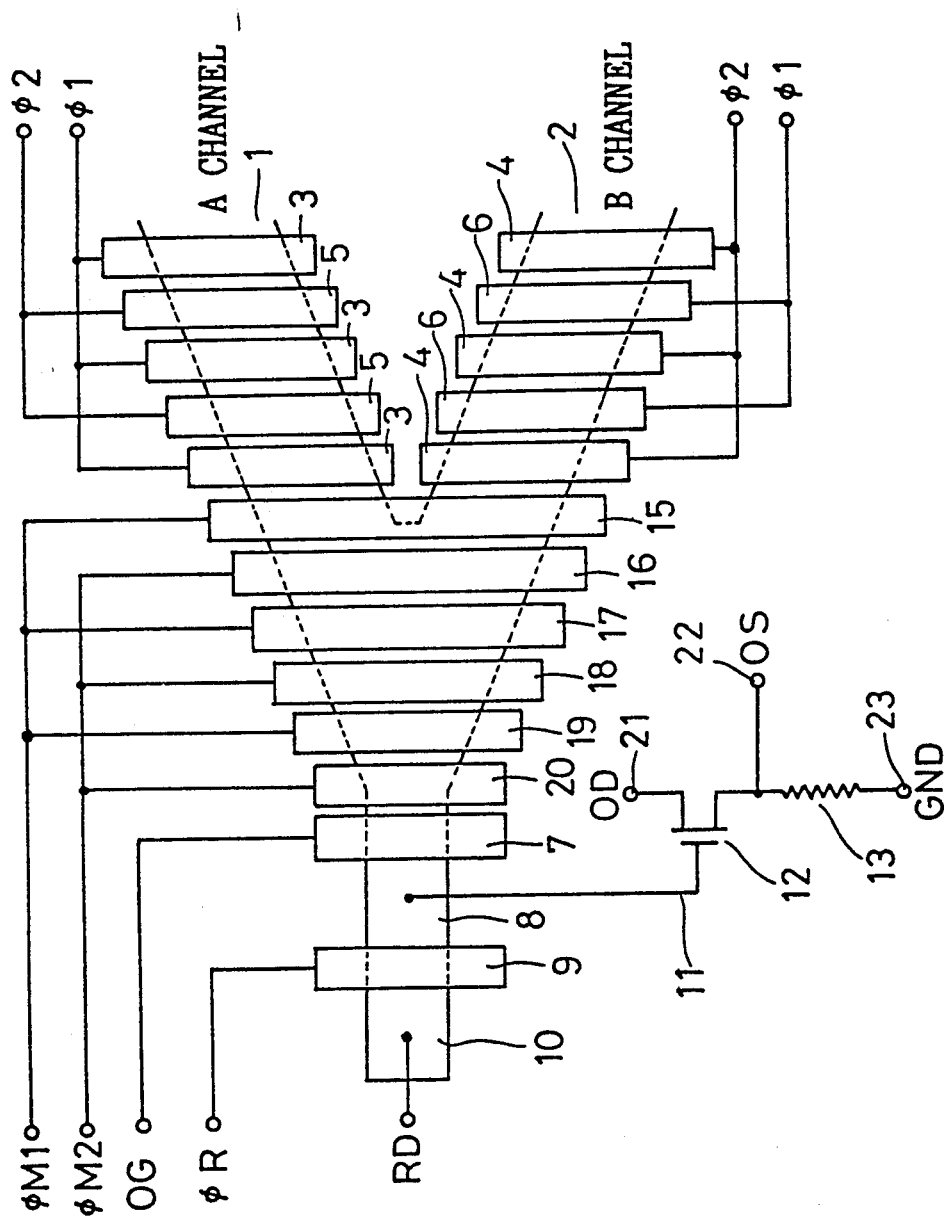
FIG. 7 shows a plane configuration of a third embodiment of the present invention.
Figure 8:
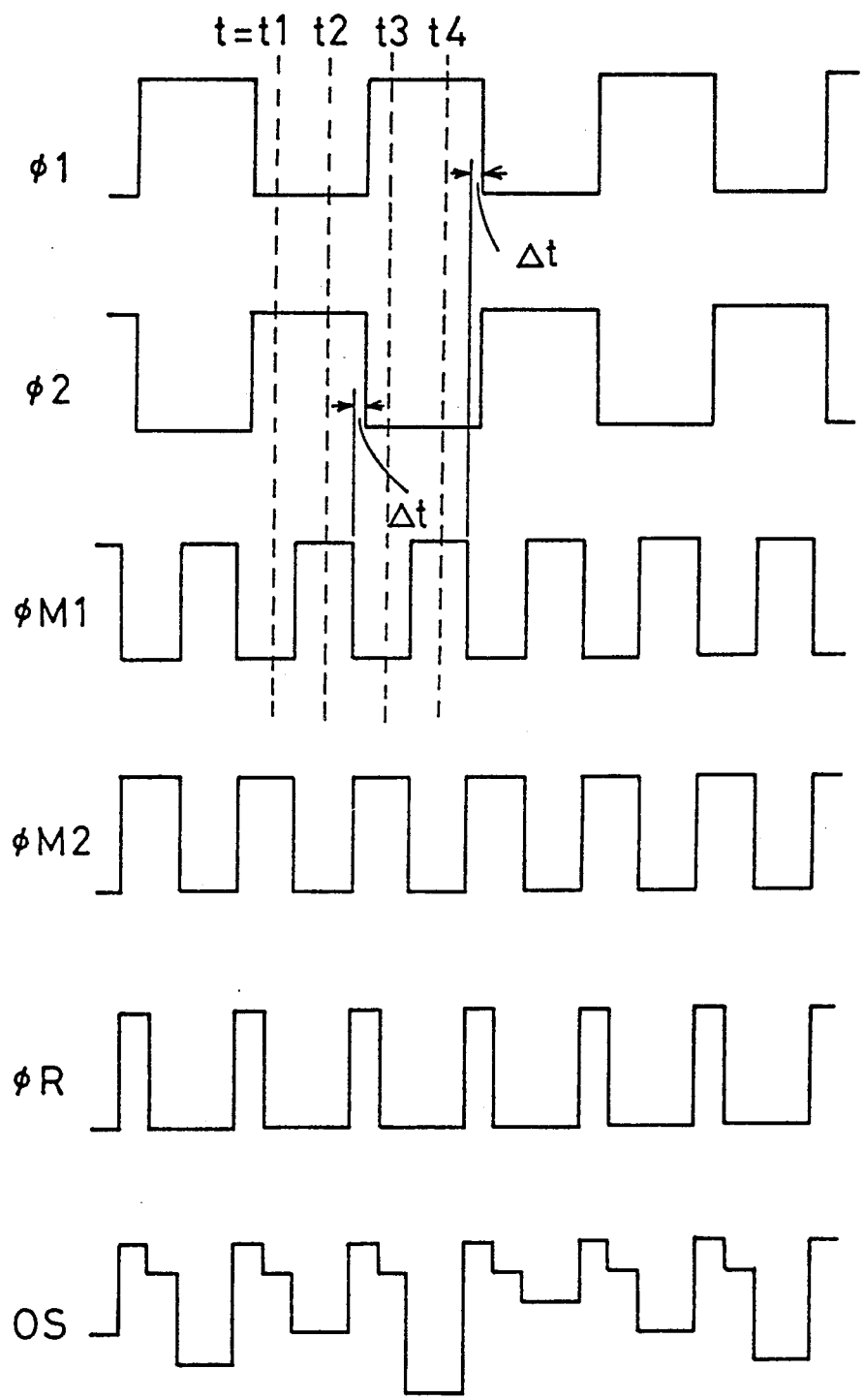
FIG. 8 is a wave form chart showing timing of clock pulses and an output signal thereof.

FIGS. 7 and 8 show a CCD which is a third embodiment of the present invention. FIG. 7 shows a plane configuration thereof. FIG. 8 shows timing of clock pulses and an output signal.

This embodiment has a configuration the same as that of the second embodiment of FIG. 5 except that a common transfer electrode 20 is added between the common transfer electrode 19 and the output electrode 7. That is, in this embodiment, the number of electrodes to which the clock pulse φM1 is applied equals the number of electrodes to which the clock pulse φM2 is applied: the number is three. In other words, the bit number of the shift registers which bit number consists of the common transfer electrodes is n (n is an integer).

With such an arrangement, if a clock pulse having the timing shown in FIG. 8 is used, it is enabled to realize a CCD where there is no difference between the DC levels of signals of two channels.

That is, in this embodiment, the signal charge reaches the floating and diffusion layer 8 when the level of the clock pulse φM2 is changed from high to low, and when this happens, the clock pulses φ1 and φ2 are halted. For this reason, no different is caused between the DC levels of signals of two channels.

In this embodiment, different from the first and second embodiments of FIGS. 3 and 5, it is necessary to slightly look to the timing of pulses. A description thereof will hereinafter be given.

By the level down of the clock pulse φ1 and the level up of the clock pulse φ2 at t=t1, the signal charges of the A and B channels are transferred to the left by half a bit, respectively. However, the signal charge of the lower portion of a transfer electrode (the clock pulse $\phi 1$ is applied to this electrode) arranged on the left end of the A channel is not transferred. This is because the level of the clock pulse M$\phi 1$ applied to the adjoining common transfer electrode 15 is low.

Then, by the level up of the clock pulse $\phi$M1 at t=t2, the above-mentioned signal change is transferred to the lower portion of the common transfer electrode 15. By the level down of the clock pulse $\phi$M1 and the level up of the clock pulse $\phi$M2 at t=t3, the signal charge of the lower portion of the common transfer electrode 15 is transferred to the lower portion of the common transfer electrode 16. By the level up of the clock pulse $\phi$M1 and the level down of the clock pulse $\phi$M2 at t=t4, the signal charge of the lower portion of the common transfer electrode 16 is transferred to the lower portion of the common transfer electrode 17.

On the other hand, the signal charges of the A and B channels are transferred to the left by half a bit, respectively, by the level up of the clock pulse $\phi 1$ and the level down of the clock pulse $\phi 2$ at t=t3. However, the signal charge of the lower portion of a transfer electrode (the clock pulse $\phi 2$ is applied to this electrode) arranged to the left end of the B channel is not transferred. The signal charge is transferred to the lower portion of the common transfer electrode 15 by the level up of the clock pulse $\phi$M1 at t=t4.

To realize the above-described operation, it is necessary to change the level of the clock pulse $\phi 1$ or $\phi 2$ to low after the level of the lock pulse $\phi$M1 is changed to low. That is, as shown in FIG. 8, it is necessary that $\Delta t > 0$. This is because the signal charge of the B channel is mingled with the signal charge (that is, the signal charge transferred through the A channel) transferred to the lower portion of the common transfer electrode 15 at t=t2 if the level of the clock pulse $\phi 2$ is changed to low when the level of the clock pulse $\phi$M1 is high.

By looking to the above, it is enabled to alternately transfer the signal charges of the A and B channels to the floating and diffusion layer 8. Moreover, it is enabled to obtain an output signal where there is no difference between the DC level of the A channel and that of the B channel.

The previously-described second embodiment is advantageous in that it is unnecessary that $\Delta t > 0$ should be considered unlike the third embodiment. In the second embodiment, however, it is necessary that the number of common transfer electrodes be odd (non-integral bit).

As described above, according to the present invention, variation (induction) which occurs as a result of capacitance coupling caused when a signal charge transferred through a plurality of CCD channels is transferred to the floating and diffusion layer 8 can be equalized. Consequently, in a charge coupled device including a plurality of CCD shift registers having a common output portion, a signal where there is no difference in an output of each CCD shift register can be obtained.

Obviously, many modifications and variations of the present invention are possible in light of the above teachings. It is therefore to be understood that within the scope of the appended claims, the invention may be practiced other than as specifically described.

What is claimed is:

1. A charge coupled device for reducing an output voltage level difference between different shift registers, comprising:

a plurality of shift registers;
a floating and diffusion layer connected to the plurality of shift registers for receiving signal charges transferred by the shift registers when driven and for converting the signal charges into voltage;
a common transfer electrode, located between the plurality of shift registers and the floating and diffusion layer, for receiving signal charges from each of the shift registers and for transferring the signal charges to the floating and diffusion layer; and
timing means for applying clock pulses to the common transfer electrode in a predetermined sequence in order that the common transfer electrode transfers the signal charges into the floating and diffusion layer while the respective shift registers are not being driven.

2. The invention of claim 1, further including an output electrode located between the common transfer electrode and the floating and diffusion layers.

3. The invention of claim 2, further including a plurality of common transfer electrodes located between the shift registers and the output electrode.

4. The invention of claim 3, wherein the number of common transfer electrodes is an even number.

5. The invention of claim 4, further including means for periodically applying a predetermined voltage to the floating and diffusion layer so that it is alternatively biased to a predetermined voltage potential and a floating condition as to its potential, the means for applying clock pulses being coordinated with the means for periodically applying a predetermined voltage to transfer the signal charges from each respective shift register only when the floating and diffusion layer is in a floating condition.

6. The invention of claim 3, wherein the number of common transfer electrodes is an odd number.

7. The invention of claim 6, further including means for periodically applying a predetermined voltage to the floating and diffusion layer so that it is alternatively biased to a predetermined voltage potential and a floating condition as to its potential, the means for applying clock pulses being coordinated with the means for periodically applying a predetermined voltage to transfer the signal charges from each respective shift register only when the floating and diffusion layer is in a floating condition.

8. The invention of claim 1, further including means for periodically applying a predetermined voltage to the floating and diffusion layer so that it is alternatively biased to a predetermined voltage potential and a floating condition as to its potential, the means for applying clock pulses being coordinated with the means for periodically applying a predetermined voltage to transfer the signal charges from each respective shift register only when the floating and diffusion layer is in a floating condition.

9. A charge coupled device for overcoming an output voltage level difference between different shift registers, comprising;

a plurality of first shift registers;
a floating and diffusion layer for receiving the signal charges transferred in the first shift registers when driven and for converting the signal charges into voltage;
a common shift register, located between the first shift registers and the floating and diffusion layer, for receiving the signal charges from the first shift registers and for transferring the signal charges to the floating and diffusion layer; and means for driving the common shift register so that the signal charges are transferred to the common floating and diffusion layer while the first shift registers are not being driven.

10. A charge coupled device as claimed in claim 9, wherein the common shift register is driven by two different kinds of clock pulses, and the number of stages for one kind of clock pulse is one more than that for the other kind of clock pulse.

11. A charge coupled device as claimed in claim 9, wherein the common shift register is driven by two different types of clock pulses, and the number of stages for one type of clock pulse is equal to that for the other type of clock pulse.

12. A charge coupled device for overcoming an output voltage level difference between different shift registers, comprising:

a plurality of shift registers;

a floating and diffusion layer for receiving the signal charges transferred in the shift registers when driven and for converting the signal charges into voltage;

first means, located between the shift registers and the floating and diffusion layer, for receiving the signal charges from the shift registers and for transferring the signal charges to the common floating and diffusion layer; and second means for applying clock pulses to the first means in order that the first means transfers the signal charges to the common floating and diffusion layer while the shift registers are not being driven.

13. A charge coupled device as claimed in claim 12, wherein the first means consists of only one common transfer stage.

14. A charge coupled device as claimed in claim 12, wherein the first means consists of a plurality of common transfer electrodes, and the second means applies the clock pulses to at least a transfer electrode which is located immediately before the floating and diffusion layer.

15. A charge coupled device for overcoming an output voltage level difference between different shift registers, comprising:

a plurality of first shift registers;

means for applying clock pulses to said first shift registers to drive them;

a common shift register for receiving the charges from the first shift registers and for shifting the signal charges through the common shift register;

a floating and diffusion layer for receiving the signal charges from the common shift register and for converting the signal charges into voltage; and means for applying clock pulses to the common shift register so that the timing of said clock pulses to the common shift register is always different from that of said clock pulses applied to the first shift registers, wherein the common shift register transfers the signal charges to the floating and diffusion layer when the first shift registers are not being driven.

16. A charge coupled device as claimed in claim 15, further including a plurality of common transfer electrodes forming the common shift register.

17. A charge coupled device as claimed in claim 16, wherein the number of common transfer electrodes is an odd number.

18. A charge coupled device as claimed in claim 15, wherein the common shift register has a transfer channel that gradually reduces in width in the direction of signal charge transfer.

* * * * *